Patented Sept. 26, 1944

2,358,870

UNITED STATES PATENT OFFICE 2,358,870

PROCESS OF FRACTIONATING AND REFINING LIVER EXTRACTS

Siegfried Maurer and Harold Oliver Wiles, Chicago, Ill.

No Drawing. Application April 10, 1942, Serial No. 438,416

2 Claims. (Cl. 167—74)

The present invention relates to improvements in processes of preparing and refining extracts from vertebrate animal organs and, more particularly, it relates to such a process wherein livers are subjected to cold treatment for the recovery of water soluble constituents for use as nutriments or accessory food factors.

In an earlier application for a process of fractionating and refining organ extracts filed July 19, 1941, Serial No. 403,234, and of which the present application is a continuation-in-part, a process is disclosed for preventing the effects of thermal oxidation, darkening of the resulting products because of damage to many of the combining constituents and the substantial elimination of the disagreeable and unpalatable taste and odors associated with products resulting from drastic heat treatments. In that process there also is disclosed and claimed a method for successively recovering lipid extracts, vitamins A and K and an anti-menorrhagic factor; also liver extracts, a lipid-free liver powder, a lipid extract containing phospholipids free from bile salts, an iron protein complex useful in correction of secondary anemia and a suitable nitrogenous fraction or parenteral primary anemia factor. In practicing that process fresh mammalian livers were macerated with about 3 volumes of water, the resulting mixture extracted with an immiscible lipid solvent and the solvent extract removed to recover a substantial portion of lipids, vitamins and anti-menorrhagic factor. The resulting aqueous mixture was then heated to produce a coagulum from which was separated a filtrate containing water soluble constituents, remaining phosphatides and other lipids. The filtrate was then spray-dried to powder form, subjected to extraction with a lipid solvent to remove any remaining fats and phospholipids and the remaining substance extracted with alcohol to remove bile salts. Any residual solvent was removed by evaporation to recover a dry lipid-free powder which was further fractionated with aqueous alcohol in a solution containing nitrogenous and other materials and an insoluble protein residue. The solution was evaporated to remove the alcohol to produce a remaining aqueous solution which was further fractionated with phenol to separate out the nitrogenous material. The latter was precipitated with acetone, the insoluble protein residue further fractionated by treatment with ferric-chloride and the resulting iron protein complex and parenteral primary factor recovered.

Mammalian liver is a particularly good source of vitamins of the B complex comprising thiamin, riboflavin, panthothenic acid, nicotinic acid as well as pyridoxin and other factors less definitely characterized. Many fish livers are particularly rich in vitamin A and also contain vitamin D in considerable quantity. They also contain substantial amounts of vitamins of the B complex. If liver preparations are to be used as dietary vitamin sources, it becomes important to preserve the original vitamin content as far as possible. This is best accomplished by minimizing the use of heat, even at the expense of leaving in the ultimate product a larger amount of physiologically inert matter. In our earlier process it is pointed out that heat coagulation accomplishes the removal of a large amount of anemia inactive material and this enhances the potency of the aqueous filtrate. The enzymes of the liver are inactivated at the temperatures used. In that process, however, a considerable amount of valuable soluble material might be occluded in the coagulum and if not otherwise recovered would be considered a disadvantage. Although it is possible to remove a portion of the inert protein of the liver by the use of heat coagulation, followed by filtration steps to separate the coagulum, another loss might occur, unless other suitable preventive steps are taken. For example, a considerable part of the vitamin content might be lost by thermo-oxidative destruction or by precipitation of protein-vitamin complex, such as flavoprotein, in which riboflavin (vitamin $B_2$) is a prosthetic group. The present invention is based on the discovery of a supplemental process to prevent such losses.

The above mentioned vitamin of the B complex is water soluble and can be extracted from the ground and macerated tissue by lixiviation with water. In a leaching process it is advisable to avoid heat or undue exposure to air or metal such as iron or copper since these might adversely influence the vitamin content.

A principal object of the present invention, therefore, is the provision of a process for the recovery of water soluble constituents containing the vitamin B complex by utilizing a relatively cold treatment to eliminate the danger of thermo-oxidative destruction and loss of the vitamin B complex, and also to eliminate the disagreeable odor and taste of crude liver extracts due to lipid and bile constituents particularly prominent in heat treating processes.

Another object of the invention is to provide a process for the recovery of the lipid fraction containing fat soluble vitamins found in mammalian and fish livers.

Other objects of the invention will in part be obvious and will in part appear hereinafter.

The invention accordingly comprises the several steps in the relation and order of one or more of such steps with respect to each of the others thereof, which will be exemplified in the process hereinafter disclosed, and the scope of the application of which will be indicated in the claims.

Since the present disclosure also contemplates the use of relatively large amounts of water, particularly with respect to mammalian livers, when compared with the amount of liver being treated a suitable drying method is necessary. However, in accordance with the principles of the present invention, conventional preliminary drying steps by means of heat application to secure a dry product is cautioned against since there still exists the danger of mechanical loss by occlusion and loss by thermo-oxidative destruction together with precipitation and loss of protein vitamin complexes.

If liver tissue is extracted with water the extract will contain lipid constituents not normally soluble in water but held in suspension by phosphatides or proteins or both. If this aqueous extract is extracted with an immiscible solvent, a large portion of the fats and other lipids including sterols will pass into the extractant phase. The phosphatides, although soluble per se in most fat solvents, are incompletely extracted.

If dry organ substance or a suitably dried aqueous extract is extracted with a fat solvent, the lipid dispersing agents are extracted with fats and other lipids. If no aqueous phase is present it is possible to use water-miscible solvents to remove other materials such as, for example, bile salts and other offensive substances by the solvent action of a suitable alcohol, such as ethanol.

Much of the disagreeable odor and taste of crude liver extracts is due to the lipids and bile constituents. This taste becomes more pronounced and offensive if the material is heated or even left standing. It is desirable, therefore, to free the liver extract as completely as possible from the objectionable substances. To do this the aqueous extract is preferably reduced to a discrete powder by a suitable process of dehydration. It is not convenient to set any exact limit of moisture content, since the amount of glucose present, the humidity of the air and the physical nature of the solid materials may all influence the point at which the powder may tend to agglomerate into masses.

While such powder conceivably may be prepared by drying the aqueous solution at ordinary or reduced pressure with or without heating, or dried by means of desiccant salts or hydrophilic liquids neither method is practicable.

The usual batch processes for evaporation are equally unsatisfactory. For example, air drying at room temperature is not feasible because of the time and size of the physical plant required. Drying the material at elevated temperatures and ordinary pressure (boiling) shortens the time but ordinarily increases tremendously the destruction of vitamins by oxidation, denaturation, pyrolysis, catalyzed reactions, etc.

To follow conventional practice would be to dry at moderate temperature and reduced pressure but this has certain undesirable features and disadvantages. This method is also a so-called batch method in which all the material to be concentrated is exposed to the adverse effect of heat for the full time of evaporation. The layer or film next to the heated surface circulates slowly and is exposed to higher temperatures than the bulk of the liquid. As the concentration of the solution is increased by evaporation, the vapor tension of the solution is lowered and the rate of evaporation is correspondingly slow. Ultimately it becomes almost impossible to remove the last of the water without using prohibitive temperatures and negative pressures.

The present invention contemplates first freezing and then macerating mammalian or fish livers. While preliminary freezing of the whole or ground liver is not essential it aids materially in rupturing the parenchymatous cells of the liver, although the addition of 2 or 3 volumes of water to the ground mammalian liver has a further cytolyzing action. As to fish livers, a lesser amount of water is necessary, although it can be satisfactorily accomplished without the addition of water. The frozen liver is thawed and passed through a filter or homogenizer, or other suitable device to remove connective tissue, large vessels and ducts. The aqueous filtrate or suspension which contains most of the original water soluble material and some suspended particulate matter, such as unruptured cells or water insoluble protein and dispersed lipids, should then be dried to a discrete powder. Preferably, we use a drying method in which the aqueous solution is projected as a fine spray into a moving column of warm unsaturated air. By this method water evaporates from the surface of the droplets, heat equivalent to the heat of evaporation is absorbed from the air, and the air temperature drops. The droplets continue to fall through unsaturated air until substantially all water is removed and the dried particles fall to the floor of the chamber. By experience we have found that liver solutions can be dried by this technic with essentially no damage to the liver constituents in that there is no oxidative or thermal damage which brings about the unpalatable taste and objectionable odor to such products, the color is very light, and the vitamin content is not greatly reduced.

The temperature of drying and the water content of the resultant powder will vary with the concentration of the solution and the inherently variable qualitative composition of the original livers.

The dry powder resulting contains all the water soluble constituents of the liver including the vitamin B complex as well as the lipids, vitamins A, D and K and anti-menorrhagic factor. These latter, i. e., lipids, vitamins and anti-menorrhagic factor are removed by extraction preferably, for example, with ethylene dichloride or other suitable lipid solvents. Bile salts and other offensive or unpalatable materials may also be removed by extraction preferably with ethyl alcohol of 95 per cent or higher concentration. To remove the bulk of the fat soluble material and to facilitate drying the liver may be extracted with fat solvent before drying. The dry powder resulting from these steps may be used as such or it may be dissolved in water or may be subjected to further fractionation or refinement. It still contains some insoluble residue. It is palatable, stable and contains substantially all the water soluble vitamin content of the original liver substance.

It will thus be seen that objects hereinbefore set forth may be readily and efficiently attained and, since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described our invention, what we claim as new and desire to secure by Letters Patent is:

1. In a process of fractionating and refining organ extracts in which livers are macerated with water and filtered to remove connective tissue, large vessels and ducts, the improvement which comprises the steps of projecting the resulting aqueous filtrate in a fine spray into a moving column of warm unsaturated air to evaporate water from the surface of the droplets, continuing this operation until all the water is removed therefrom and the dry particles are recovered in powder form containing all the water soluble constituents of the liver, and extracting the resulting powder with ethylene dichloride to recover lipids, vitamins A, D and K and anti-menorrhagic factor, leaving a residue which contains substantially all the water soluble vitamin content of the original liver substance.

2. A process of fractionating and refining organ extracts, which comprises thoroughly macerating livers with water until a thorough mixture is provided, spray-drying the mixture to discrete particle form, extracting said particles with ethylene dichloride to obtain lipids, vitamins A, D and K and anti-menorrhagic factor, and then extracting the residue with strong alcohol to remove bile salts and other offensive and unpalatable material, leaving a residue which contains substantially all the water soluble vitamin content of the original liver substance.

SIEGFRIED MAURER.
HAROLD OLIVER WILES.